May 11, 1926.
I. S. DEMENT
AUTOMOBILE BRAKE
Filed Feb. 10, 1921
1,584,358
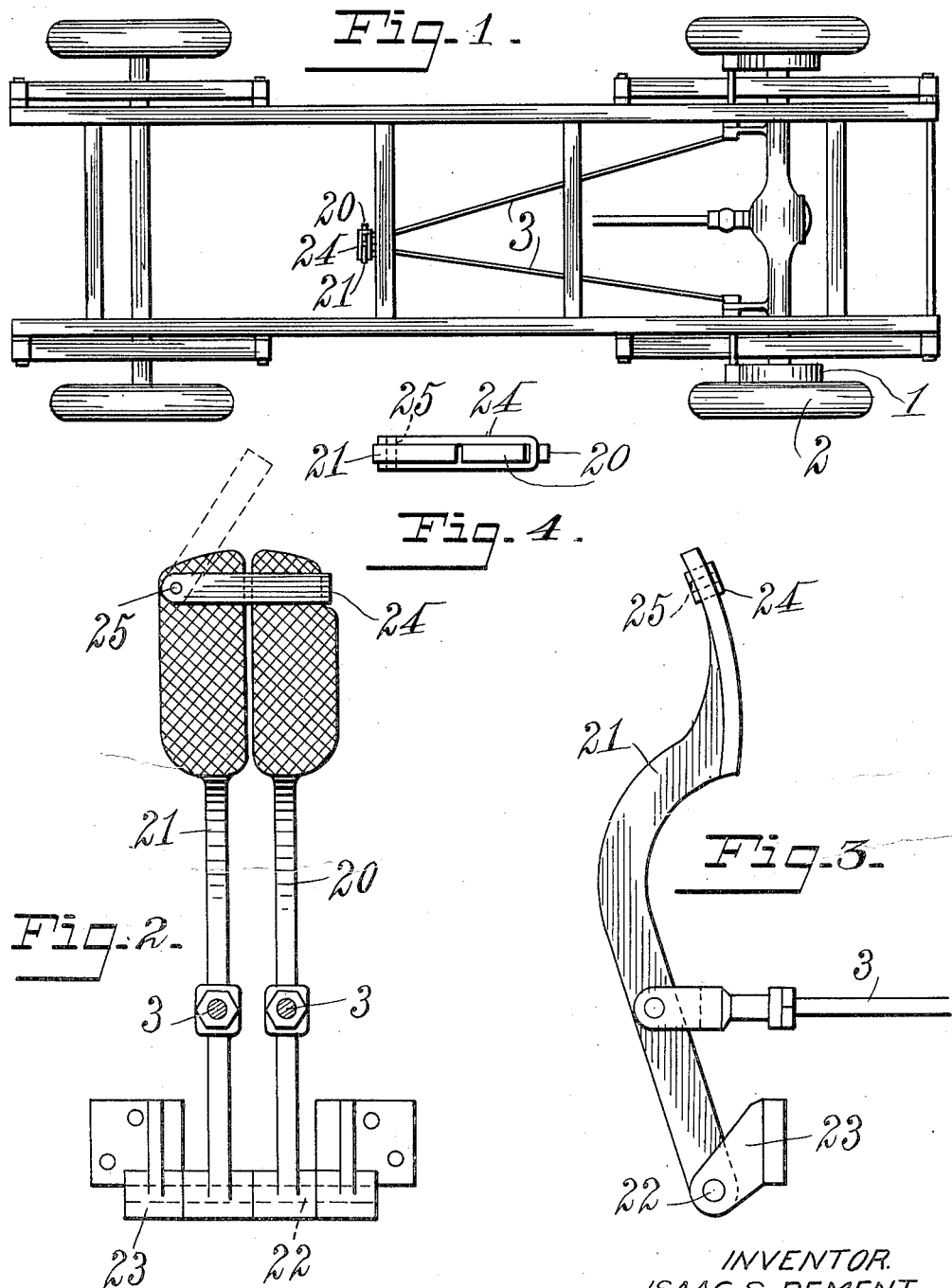
INVENTOR.
ISAAC S. DEMENT.
By Edward S. Reed
ATTORNEY.

Patented May 11, 1926.

1,584,358

UNITED STATES PATENT OFFICE.

ISAAC S. DEMENT, OF DAYTON, OHIO.

AUTOMOBILE BRAKE.

Application filed February 10, 1921. Serial No. 444,010.

This invention relates to brakes for automobiles and more particularly to brakes of such a character that the movement of the driving wheels will be individually controlled thereby.

It is well known that when an automobile, equipped with the usual compensating gearing, gets into a position in which one of the driving wheels has insufficient traction this wheel will spin and the power transmitted to the other wheel, which may be in firm engagement with the roadway, will not be sufficient to move the automobile. Consequently, the automobile can not be moved from its position by its own power.

The object of the present invention is to provide a braking device whereby the rotation of the free wheel may be retarded, thereby causing sufficient power to be applied to the other wheel to move the vehicle.

A further object of the invention is to provide such a device in which the ordinary brakes may be employed for the purpose specified.

Other objects of the invention will appear as the device is described in detail.

In the accompanying drawings Fig. 1 is a plan view of the chassis of an automobile showing the invention applied thereto; Fig. 2 is a rear elevation of the two part foot lever; Fig. 3 is a side elevation of said foot lever; and Fig. 4 is a plan view of the same.

In these drawings I have illustrated one embodiment of my invention, in which I have utilized the foot brake lever for controlling the brakes either in unison or individually. The brakes may be of any suitable character and I preferably utilize the ordinary brakes with which an automobile is equipped, but it will be understood that the term brake as herein employed is intended to include any device which will effectively retard the rotation of the driving wheel. In these drawings I have shown the ordinary band brakes 1 which are applied to the driving wheels 2 in the usual manner and which are operated by connecting rods and which are operated by connecting rods 3 extending forwardly to a brake actuating device. The brake actuating device is of such a character and is so connected with the respective brake rods 3 that by its manipulation the two brakes may be operated either in unison or individually, at the will of the operator.

In the form of the device shown I have utilized a foot lever for operating the brakes and in order that the brakes may be individually operated I have shown this foot lever as comprising two parts, 20 and 21 which are mounted on a shaft 22, which in turn is mounted in bearings 23, each part of the foot lever being connected with one of the brake rods 3 at a point above its axis. It will be apparent, therefore, that by operating the two parts of the foot lever separately the brakes can be individually controlled and by operating the two parts of the lever simultaneously the brakes may be operated in unison. It may be desirable that some means be provided for normally connecting the two parts of the foot lever one to the other so that they will move in unison regardless of the manner in which the pressure is applied thereto, and in the present instance I have shown such connecting means in the form of a clip 24 pivotally mounted at 25 on one part of the foot lever and adapted to embrace the adjacent end portion of the other part of the foot lever, thereby tying the two parts together and constituting the same, under normal conditions, a single foot lever. When it is desired to operate the brakes individually the clip is moved into an inoperative position, thus disconnecting the two parts of the lever.

The operation of the device will be readily understood from the foregoing description thereof and it will be apparent that if the automobile is in such a position that one of the wheels is running free and no power being applied to the other it is only necessary for the driven to apply the brake to the free running with sufficient pressure to retard its movement and that because of this retardation power will be transmitted from the compensating mechanism to the other driving wheel, thereby causing the vehicle to be propelled forwardly.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In an automobile, the combination with driving wheels, and a brake for each wheel, of a foot lever comprising two parts connected with the respective brakes and means for connecting said parts of said foot lever to cause them to move in unison.

2. In an automobile, the combination with driving wheels, and a brake for each wheel, of a foot lever comprising two separately operable parts, each having a foot piece, and a connecting member mounted on the foot piece of one part of said lever and movable into and out of engagement with the foot piece of the other part of said lever.

3. In an automobile, the combination with driving wheels, and a brake for each wheel, of a foot lever comprising two separately operable parts each having a foot piece, and a loop shaped connecting member pivotally mounted on the foot piece of one part of said lever near the end thereof, and movable into and out of a position to embrace the corresponding end of the foot piece of the other part of said lever.

4. The combination with a vehicle including a pair of drive wheels, of a brake for each wheel, a sectional brake pedal, each of the sections connected with a separate brake and operable separately to actuate either brake and means carried by either section to engage complementary means on the other section for temporarily fastening said pedal sections together for unitary action.

5. The combination with a vehicle including a pair of drive wheels, of a brake for each wheel, a sectional brake pedal, each of the sections connected with a separate brake and operable separately to actuate either brake, said pedals being arranged side by side and having contiguous heads adapted to application of the foot simultaneously to both or independently to either whereby they may be operated in unison or separately, and means for temporarily fastening said sections together for positive unitary action.

In testimony whereof, I affix my signature hereto.

ISAAC S. DEMENT.